May 15, 1923.

A. C. ROEBUCK

INTERMITTENT SHUTTER MECHANISM

Filed Nov. 4, 1920 3 Sheets-Sheet 1

Inventor:
Alvah C. Roebuck
By Nissen & Crane
Attys.

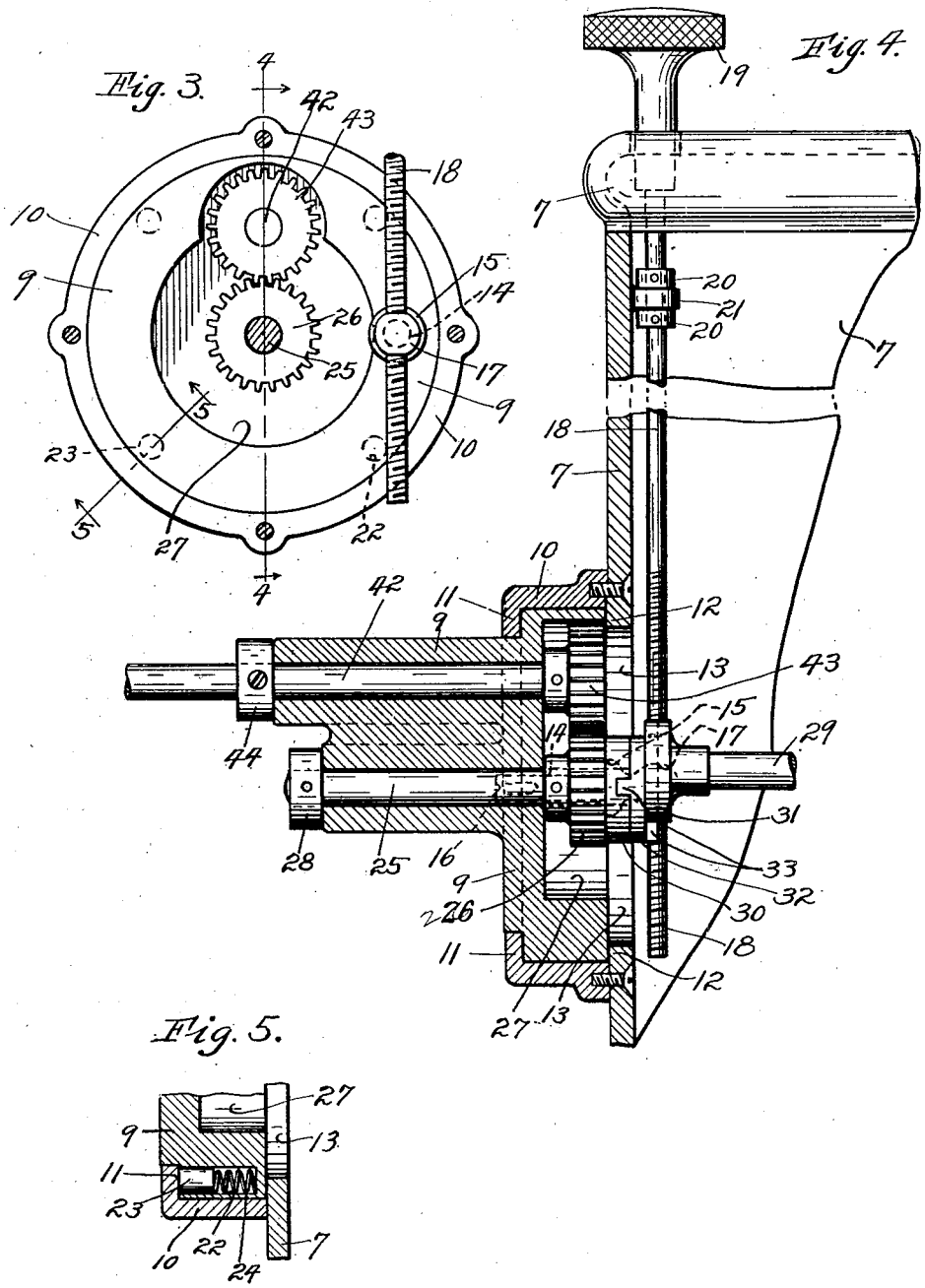

May 15, 1923.

A. C. ROEBUCK 1,455,094

INTERMITTENT SHUTTER MECHANISM

Filed Nov. 4, 1920    3 Sheets-Sheet 3

Inventor:
Alvah C. Roebuck
By Nissen & Crane
Attys.

Patented May 15, 1923.

1,455,094

UNITED STATES PATENT OFFICE.

ALVAH C. ROEBUCK, OF CHICAGO, ILLINOIS.

INTERMITTENT-SHUTTER MECHANISM.

Application filed November 4, 1920. Serial No. 421,783.

*To all whom it may concern:*

Be it known that I, ALVAH C. ROEBUCK, a citizen of the United States, residing at Chicago, in the county of Cook and State of Illinois, have invented certain new and useful Improvements in Intermittent-Shutter Mechanism, of which the following is a specification.

My invention relates to motion picture apparatus, and more particularly to intermittent shutter mechanisms for such devices.

One object of my invention is the provision of a simple and efficient intermittent shutter mechanism.

A further object is the provision of a mounting for an intermittent shutter so that it may be adjusted with respect to the lens of a motion picture apparatus to vary the time of cutting off light passing through said lens.

A still further object is the provision of an intermittent shutter mounting mounted to rotate about an axis at one side of a lens with which the intermittent shutter is associated.

Other objects will appear hereinafter.

An embodiment of my invention is indicated in the accompanying drawings, forming a part of this specification, and in which—

Fig. 3 is an enlarged section taken as looking from line 3—3 in Fig. 2;

Fig. 4 is an enlarged fragmental section taken as viewed from a line 4—4 in Fig. 3, but showing more of the mechanism than is indicated in Fig. 3.

Fig. 5 is a section taken on line 5—5 of Fig. 3; and

Figure 1:
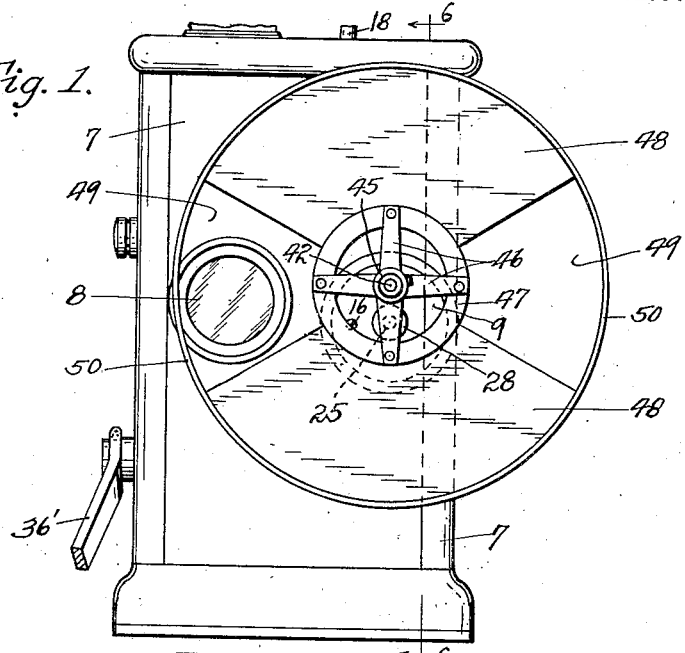
Fig. 1 is a front elevation of a motion picture mechanism embodying my invention.
Figure 2:
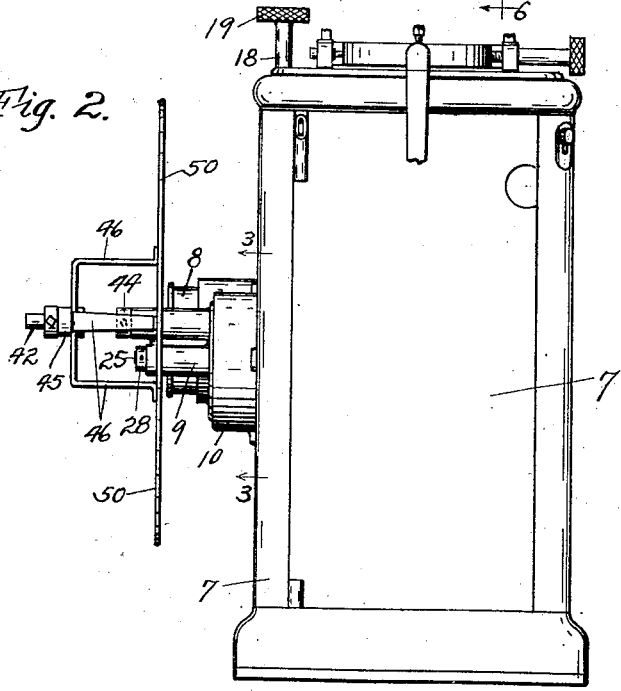
Fig. 2 is a side elevation of the same.

In the drawings, I have indicated a fireproof motion picture mechanism housing 7 which may be of any preferred or approved design. In such devices there is ordinarily a light passage therethrough with a lens 8, generally termed an "objective," disposed in the front of the casing in axial alinement with the light passage. At one side of the light passage it is customary to mount an intermittent shutter for closing the passage of light from said lens while the picture film is in motion. My improvement has to do with the mounting of such a shutter.

On the front of the housing 7 adjacent the lens 8 I mount a bearing member 9 in a socket to rotate on an axis substantially parallel with the axis of said light opening. The socket in which the bearing member 9 is mounted comprises a shell member 10 having a substantially cylindrical bore fitting the periphery of the base of said bearing member and a lip 11 reaching around on the front of the base of said bearing member. A portion 12 of the housing 7 provides means for limiting the bearing member toward the housing and adjacent the part 12 is a cut-away portion 13 in the housing, as clearly indicated in Fig. 4.

At one side of the axis of bearing member 9 I mount a shaft 14 having a shoulder 15 adjacent one end and a screw 16 for holding it against longitudinal movements and leaving it free to rotate in said bearing member. At the inner end of the shaft 14 is a head 17 in which is threaded a screw 18. The latter is provided with a knurled head 19 at its top which extends out of the housing 7 for manually rotating the screw to cause rotation of the bearing member 9 in its socket. The screw 18 may be provided with collars 20 on each side of a bearing 21 in the casing to hold such screw against longitudinal movements, the opening through bearing 21 is large enough to permit swinging of screw 18 in order to oscillate member 9. Any other suitable means may be utilized to rotate the bearing member 9 when so desired.

I find it desirable to provide some sort of friction means between the bearing member 9 and its socket so as to eliminate vibration of the bearing member in its socket. In the present instance I have indicated recesses 22 in the base of bearing member 9 with a pin 23 and compression spring 24 in each recess. The pin 23 is therefore held tightly against lip 11 of member 10 by the spring 24.

At the axis of bearing member 9 I journal a shaft 25 which is provided with a gear 26 in a recess 27 in the back of bearing member 9. The outer end of the shaft 25 may be provided with a collar 28 so that the collar 28 and gear 26 hold the shaft 25 against longitudinal movements. The inner end of the shaft 25 is connected by a universal joint to a driving shaft 29. Any desirable form of flexible or universal joint may be provided, the form shown is well-known and comprises collars 30 and 31 with a disc 32 between said collars and a tongue 33 at each side of said disc engaging a suitable groove in one of the collars. The arrangement is such that one of the tongues 33 and its corresponding groove is disposed at substantially a right angle to the other tongue and its corresponding groove. This permits moving of shaft 29 upwardly and downwardly without interrupting the driving of shaft 25 from shaft 29.

Figure 6:
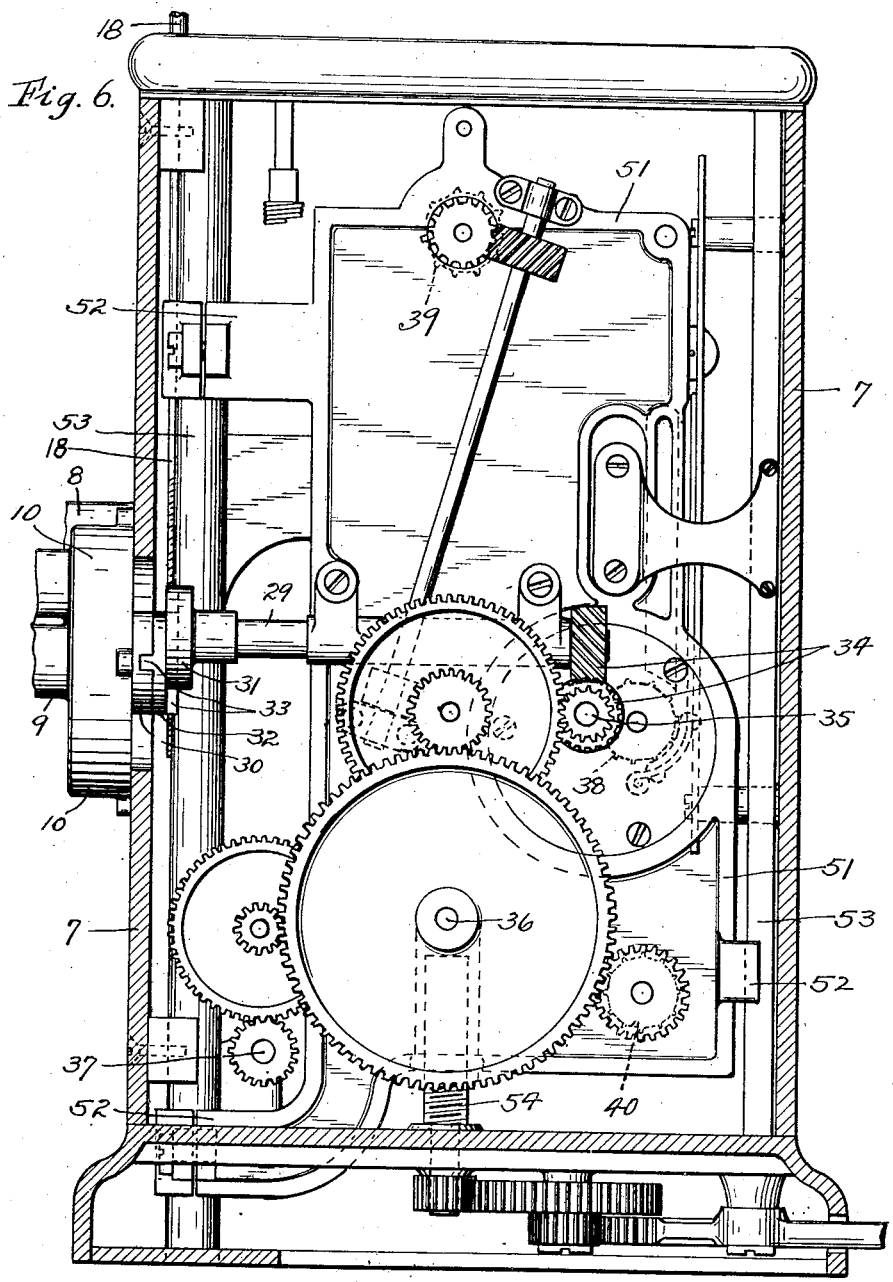
Fig. 6 is an enlarged section taken on line 6—6 of Fig. 1.

Shaft 29 may be driven in any desirable manner. In Fig. 6 I have indicated it as being connected by spiral gears 34 to a shaft 35 and the latter connected through a train of gears to a main drive shaft 36. The latter can be operated by a crank, not shown, attached directly to said shaft 36 or driven from a shaft 37 through the gears by an electric motor, or the like, not shown. The shaft 35 is indicated as the one which directly operates the Geneva star and cam intermittent movement which operates the intermittent sprocket 38. A feed sprocket 39 and a take-up sprocket 40 are also driven by suitable gearing from said shaft 36, such as indicated in Fig. 6, or in any other desirable manner. These latter sprockets feed the film to and take it up from the intermittent sprocket 38. A suitable film guide, not shown, directs the film across the light passage of the device, and such film is moved by the intermittent sprocket 38 in the usual manner.

In mechanism of this character it is the usual custom to provide the light passage with its axis on a fixed line through the housing 7 and in order to bring the film in proper position so that one entire picture only of the film is in position to be illuminated by light passing through the light passage, the film-moving mechanism is mounted for vertical movement. I have indicated the members 29 to 40, inclusive, as being mounted on a frame 51 which has ears 52 engaging upright guides 53 in the casing 7. Any desirable means may be utilized to move the frame 51 vertically in the housing 7. I have indicated a screw 54 journaled in the base of housing 7 and threaded in the lower part of frame 51 so that rotation of the screw 54 moves the frame 51 vertically.

This moving of the frame 51, usually termed "framing the picture" moves shaft 29 vertically with respect to shaft 25 and consequently the universal joint comprising members 30 to 33, inclusive, are necessary to provide a continuous driving means for shaft 25.

Also, journaled in the bearing member 9 substantially parallel to the shaft 25 and eccentric to the axis of said bearing member is an intermittent shutter shaft 42. The latter is held against longitudinal movements by a gear 43 fixed on its inner end meshing with gear 26 and a collar 44 on its outer end portion.

At the outer end of the shaft 42 is fixed a hub 45 having radiating and offset spokes or arms 46. These arms 46 are offset back toward the housing 7 in a manner to mount the intermittent shutter as close to the lens 8 as can be conveniently done. On the ends of the arms 46 is a ring 47 carrying two blades 48 spaced apart by spaces 49. The periphery of the blades 48 are connected together by a ring 50, as clearly indicated in Fig. 1. It will be understood that the number and relations of the blades 48 and spaces 49 may be changed as desired and are to be formed with relation to the movement of intermittent sprocket 38. It is desirable to arrange these blades and spaces so that the lens 8 will be entirely covered by one of the blades 48 by the time intermittent sprocket 38 begins to move and that the intermittent sprocket will have completed one movement to move a new picture into the light passage before the back edge of said blade 48 begins to uncover said lens and so that the blade will begin to open the light passage at the moment the film stops. In machines of this character now on the market it is a tedious operation to set the shutter so that it will be accurately timed with the intermittent sprocket movement. Usually the shutter must be shifted while the machine is at rest and its accuracy cannot be tested until put in motion. My improvement provides for setting the shutter while the machine is in motion so that the operator can watch his results on the screen, shifting the shutter either way until he gets a perfect picture by operating the knurled handle 19. If the shutter is not properly timed it produces what is called "drag" or "ghost" on the screen; that is, the picture in the act of sliding down, produces a blurred impression.

This device accomplishes the adjustment of the blades 48 with respect to the movement of the film across the light path by rotating the shaft 42 around the shaft 25. This movement not only changes the relation of the edges of the blades 48 to the axis of the light passage by moving shaft 42 toward and away from lens 8, but causes rotation of shaft 42 through the connecting gears 26 and 43 to change the relation of the edges of the blades 48 with the axis of the light passage.

I claim:—

1. Motion picture apparatus comprising a lens; an intermittent shutter pivoted on an axis parallel to the axis of said lens; and means for shifting the axis of said intermittent shutter bodily relatively to said lens, without changing the parallelism of said axes.

2. Motion picture apparatus comprising a lens; a drive shaft journaled on an axis at one side of and parallel with the axis of the lens; and an intermittent shutter pivoted on an axis shiftable around the first-mentioned axis.

3. Motion picture apparatus comprising a housing having an opening therein; a bearing member having one end against the housing around said opening; a shell around and providing a bearing for said bearing member; means securing the shell to the housing; a shaft journaled at the axis of the bearing member; a shaft journaled in the bearing member parallel with the first-mentioned shaft and connected with the latter; a shutter on the second-mentioned shaft; and a lens tube attached to the housing with its axis parallel to the axes of said shafts.

4. Motion picture apparatus comprising a housing having an opening therein; a cylindrical shell secured to the housing around said opening; an inwardly extending lip on the shell; a bearing member having a cylindrical base portion journaled in the shell between said lip and a portion of the housing around said opening; two shafts journaled in said bearing member with one of the shafts eccentric to the axis of said bearing member; and a lens tube mounted on the housing with its axis parallel with the last-mentioned shaft.

5. Motion picture apparatus comprising a rotary bearing member; a drive shaft journaled at the axis of said member; an intermittent shutter shaft substantially parallel and operatively connected with said drive shaft and journaled in said member eccentrically to the axis of the latter; a lens at one side of said member with its axis parallel to the axis of said member; and means for rotating said member.

6. Motion picture apparatus comprising a housing having an opening in one side with a socket therein around said opening; a member having a peripheral flange rigidly mounted in the socket; a member attached eccentrically to the axis of said member; a screw held against longitudinal movements in the housing and threaded in said member; an intermittent shutter shaft journaled in said member eccentrically to the axis of the latter; a lens mounted at one side of said member and having its axis parallel to the axis of said intermittent shutter shaft; and means for rotating the intermittent shutter shaft.

7. Motion picture apparatus comprising a rotary member; a drive shaft journaled at the axis of said member; an intermittent shutter shaft journaled in said member and operatively connected to said drive shaft; a lens at one side of said member and parallel with the intermittent shutter shaft; and adjusting means attached to said member for moving the latter to vary the distance between the axis of said intermittent shutter shaft and the lens without destroying the parallelism of said intermittent shutter shaft and the lens.

8. Motion picture apparatus comprising a housing; a socket on the housing; a bearing member journaled in said socket; an intermittent shutter shaft journaled in the bearing member; a head having a pivotal connection with the bearing member eccentrically to the axis of the latter; and means attached to the head for rotating the bearing member.

9. Motion picture apparatus comprising a housing; a socket on the housing; a bearing member journaled in the socket and having recesses therein; spring-pressed pins in said recesses engaging the socket; an intermittent shutter shaft journaled in the bearing member; and an operating means attached to the housing and pivoted to the bearing member eccentrically to the axis of the latter.

10. Motion picture apparatus comprising a housing; a socket on the housing; a bearing member journaled in the socket and having recesses therein; spring-pressed pins in said recesses engaging the socket; an intermittent shutter shaft journaled in the bearing member; and an adjusting means attached to said bearing member for rotating the latter in said socket.

11. Motion picture apparatus comprising a housing; a bearing member having one end against said housing and a shoulder spaced from the latter; a socket member on the housing encircling the bearing member and having a portion engaging said shoulder; spring-pressed pins in said bearing member engaging the socket member; and an intermittent shutter shaft journaled in the bearing member eccentrically to the axis of the latter.

12. Motion picture apparatus comprising a housing; a bearing member journaled on the housing; a lens in the housing at one side of the bearing member and parallel with the axis of the latter; a drive shaft journaled at the axis of the bearing member; an intermittent shutter shaft journaled eccentrically to the axis of said bearing member and parallel with the axis of the latter; gears connecting said shafts together; and means for rotating the bearing member to shift the intermittent shutter shaft with respect to the lens and at the same time rotate the intermittent shutter shaft.

13. Motion picture apparatus comprising a housing; a bearing member rotatably mounted on said housing; a lens at one side of said bearing member; an intermittent shutter shaft journaled in the bearing member eccentrically to the axis of the latter; a member swiveled in said bearing member eccentrically to the axis of the latter; and an adjusting screw threaded in said swiveled member for rotating said bearing member.

14. Motion picture apparatus comprising a housing; a bearing member journaled on said housing and extending outwardly from the latter; an intermittent shutter shaft journaled in said bearing member and extending outwardly therefrom; a hub on said intermittent shutter shaft; intermittent shutter blades on the hub; and arms joining said intermittent shutter blades and said hub, said arms being offset back toward the housing.

15. Motion picture apparatus comprising a housing having a light path therethrough; a lens mounted on the housing in said light path; a shutter mounted on the housing with its plane of travel disposed across and at right angles to said light path; and means for moving the axis of the shutter laterally without disturbing said angular relation of the plane of travel of the shutter with respect to the light path.

16. Motion picture apparatus comprising a housing having a light path therethrough; a lens mounted on the housing in said path of light; a member journaled on the housing on an axis parallel with said light path; a shutter journaled in said member on an axis parallel and eccentric to the axis of said member, said shutter being disposed across said light path with its path of travel at right angles to the latter; and means for rotating said member to move the shutter toward and away from the light path without changing the angularity of the path of travel of said shutter with said light path.

In testimony whereof I have signed my name to this specification on this 23rd day of October, A. D. 1920.

ALVAH C. ROEBUCK.